United States Patent
Hashizawa et al.

(10) Patent No.: US 6,264,206 B1
(45) Date of Patent: Jul. 24, 2001

(54) PACKING HOLD STRUCTURE

(75) Inventors: Shigemi Hashizawa; Yutaka Masuda, both of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/176,208

(22) Filed: Oct. 21, 1998

(30) Foreign Application Priority Data

Oct. 21, 1997 (JP) .................................................. 9-288880

(51) Int. Cl.$^7$ ..................................................... F16J 15/02
(52) U.S. Cl. .................... 277/641; 277/644; 277/648; 277/649; 277/910
(58) Field of Search ................... 277/637, 639, 277/641, 644, 648, 649, 606, 626, 566, 574, 910

(56) References Cited

U.S. PATENT DOCUMENTS

| 1,896,795 | | 2/1933 | Kendall . | |
|---|---|---|---|---|
| 2,604,507 | * | 7/1952 | Tyson | 277/644 |
| 2,700,561 | * | 1/1955 | Svenson | 277/562 |
| 2,954,264 | * | 9/1960 | Tisch et al. | 277/644 |
| 3,052,478 | * | 9/1962 | Horvereid | 277/644 |
| 3,175,833 | * | 3/1965 | Morse . | |
| 3,472,523 | * | 10/1969 | Rentschler et al. | 277/644 |
| 3,480,301 | | 11/1969 | Kroening . | |
| 4,475,738 | * | 10/1984 | Eicher et al. | 277/644 |
| 5,002,290 | * | 3/1991 | Pernin | 277/644 |
| 5,193,498 | | 3/1993 | Futami . | |
| 5,482,296 | * | 1/1996 | Peppiatt et al. | 277/562 |
| 5,529,313 | | 6/1996 | Malks . | |
| 5,551,705 | * | 9/1996 | Chen et al. | 277/644 |

FOREIGN PATENT DOCUMENTS

| 25 46 628 A1 | 4/1977 | (DE) . | |
|---|---|---|---|
| 42 05 442 A1 | 11/1992 | (DE) . | |
| 42 35 437 C1 | 9/1993 | (DE) . | |
| 93 12 448.1 | 12/1993 | (DE) . | |
| 195 04 186 A1 | 8/1996 | (DE) . | |
| 95/22 019 | 8/1995 | (EP) . | |
| 59-86754 | 5/1984 | (JP) . | |
| 4-327065 | 11/1992 | (JP) . | |
| 5-237722 | 9/1993 | (JP) . | |
| 7-226256 | 8/1995 | (JP) | H01R/13/52 |

* cited by examiner

*Primary Examiner*—Anthony Knight
*Assistant Examiner*—Alison K. Pickard
(74) *Attorney, Agent, or Firm*—Sughrue, Mion, Zinn, Macpeak & Seas, PLLC

(57) ABSTRACT

In the present packing hold structure, in a packing, there are provided projecting portions which respectively project toward the two mutually opposing inner surfaces 13 of a packing storage groove 13, and a dimension between the two projecting portions is set larger than the width dimension 13 of the packing storage groove 13. While the packing is stored within the packing storage groove, the projecting portions of the packing are respectively pressed against the two inner surfaces of the packing storage groove 12, thereby allowing the packing 12 to be held by itself within the packing storage groove.

6 Claims, 5 Drawing Sheets

PACKING HOLD STRUCTURE

BACKGROUND OF THE INVENTION

1. Field of the Invention

The present invention relates to a packing hold structure for holding a packing within a packing storage groove formed in a seal end face.

2. Description of the Related Prior Art

Now, FIG. 4 shows a waterproof connector 1 which is disclosed in Japanese Patent Unexamined Publication No. Hei. 7-226256 and employs a conventional packing hold structure. In FIG. 4, the waterproof connector 1 comprises a male connector housing 2, and a female connector housing 4 including a hood portion 3 with which the male connector housing 2 can be fitted. In the outer periphery of the male connector housing 2, there are provided packings 5 respectively on the leading and trailing end sides in the fitting direction thereof. In particular, in the conventional-packing hold structure, while the male connector housing 2 is fitted with the interior portion of the hood portion 3 of the female connector housing 4, the packings 5 are held by and between the outer periphery of the male connector housing 2 and the inner surface of the hood portion 3 while they are in close contact with them, whereby the interior portions of terminal storage chambers 6 formed in the male connector housing 2 can be made waterproof.

In the thus structured waterproof connector 1, in the outer periphery of the male connector housing 2, there are formed packing storage grooves 7 each having a concave-shaped section, and the packings 5 each having a circular-shaped section are respectively stored within the packing storage grooves 7 in such a manner that they project from the outer periphery of the male connector housing 2 by a given height. And, the projecting portions of the packing storage grooves 7 provide seal surfaces 5a which can be closely contacted with the inner walls 3a of the hood portion 3; that is, the seal surfaces 5a prevent water from invading into between the male connector housing 2 and the inner surfaces 3a of the hood portion 3.

However, in the above-mentioned waterproof connector 1, when bringing the male connector housing 2 into fit with the interior portion of the hood portion 3, since the packings 5 are moved while they are in close contact with the inner surfaces 3a of the hood portion 3, the packings 5 can be removed out from the packing storage grooves 7. If the packings 5 are removed out from the packing storage grooves 7, then the packings 5 are not held in their normal or proper conditions between the male connector housing 2 and the inner walls 3a of the hood portion 3, so that the waterproof performance of the waterproof connector 1 is badly degraded.

Also, in the case of such butt packings as shown in FIG. 5 which are used to prevent water from invading between equipment and a connector, there is a possibility that such butt packings can be removed while they are being carried before they are installed to the equipment.

To avoid this, there is proposed a structure in which, as shown in FIG. 6, a packing 9 is formed such that it includes a securing projection 9a, and a packing storage groove 10 is formed such that it includes in the bottom wall 10a thereof a securing hole 11 to which the securing projection 9a can be secured, whereby the packing 9 can be held within the packing storage groove 10.

However, in this case, when storing the packing 9 into the interior portion of the packing storage groove 10, to insert the securing projection 9a into the securing hole 11, the packing 9 must be pushed into the packing storage groove 10 with a strong force. This results in the poor efficiency of an operation to assemble the packing 9 into the packing storage groove 10.

Also, in a state where the securing projection 9a is not positively secured to the securing hole 11, because the projecting height of the packing 9 from the periphery of the opening of the storage groove 10 varies, the uniform contact of the packing 9 with its mating contact surface cannot be obtained, which degrades the waterproof performance of the packing.

Further, provision of the securing projection 9a in the packing 9 complicates the shape of the packing 9 and, therefore, a metal mold for molding the packing 9 with such securing projection 9a is also complicated in shape, which results in the expensive manufacturing cost of the packing 9.

SUMMARY OF THE INVENTION

It is an object of the present invention to eliminate the drawbacks found in the above-mentioned conventional packing hold structures. Namely, it is an object of the invention to provide a packing hold structure which allows a packing to have a simple shape, can provide a high efficiency in an operation to assemble the packing into a packing storage groove, and can offer a high waterproof performance.

The above-mentioned object can be attained by a packing hold structure according to the invention, for holding an elastic packing within a packing storage groove formed in a seal end face, wherein, in the packing, there are provided projecting portions respectively projecting toward the two mutually opposing inner surfaces of the packing storage groove, a dimension between the top portions of the projecting portions is set larger than the width dimension of the packing storage groove, and, while the packing is stored within the packing storage groove, the projecting portions of the packing are respectively pressed against the inner surfaces (22, 23) of the packing storage groove to thereby allow the packing to be held by itself within the packing storage groove.

In the present packing hold structure, if the packing is inserted into the packing storage groove, the projecting portions of the packing are respectively pressed against the two inner surfaces of the packing storage groove to thereby permit the packing to be held by itself within the packing storage groove.

In this case, since the projecting portions are simply provided in the packing in such a manner as to project toward the two mutually opposing inner surfaces of the packing storage groove, the shape of the packing can be simplified. Besides this, when inserting the packing into the packing storage groove, the packing can be inserted into the packing storage groove simply by sliding the respective projecting portions against the two inner surfaces of the packing storage groove, which can facilitate the assembling of the packing into the packing storage groove.

Further, because the packing is held by itself within the packing storage groove, not only there is no possibility that the packing can be removed unexpectedly from within the packing storage groove but also the packing can be closely contacted with its mating mounting end face at a normal position, which results in a high waterproof performance.

A packing hold structure according to the present invention, on the seal surface side of the packing and on the side of the packing facing the bottom surface side of the packing storage groove, there are formed absorbing recessed portions which absorb reactive forces generated when the projecting portions are pressed against the inner surfaces of the packing storage groove, thereby being able to restrict the expansion of the packing in a direction where the packing is projecting from the seal end face.

In the present packing hold structure, when the projecting portions of the packing are respectively contacted with the two inner surfaces of the packing storage groove, the whole packing is going to expand in a direction where the packing is projecting from the seal surface; however, since the reactive forces generated and given from the two inner surfaces of the packing storage groove are absorbed by the absorbing recessed portions of the packing, the expansion of the packing can be restricted. As a result of this, the projecting height of the packing from the seal surface can be restricted, whereby there can be obtained a good mounting condition between the packing and its mating mounting end face, which leads to a proper water-proof performance.

In a packing holding structure according to the invention, preferably, in the number of the projecting portions respectively provided in the packing in such a manner as to project toward the inner surfaces of the packing storage groove is two or more.

In the present packing hold structure, due to provision of two or more of projecting portions in the packing, the reactive forces generated and given from the two inner surface of the packing storage groove can be dispersed, which can restrict the expansion of the packing further to thereby be able to restrict the projecting height of the packing from the seal surface.

DETAILED DESCRIPTION OF THE PREFERRED EMBODIMENTS

Now, description will be given below of the preferred embodiments of a packing hold structure according to the invention with reference to the accompanying drawings.

FIRST EMBODIMENT

Figure 1:
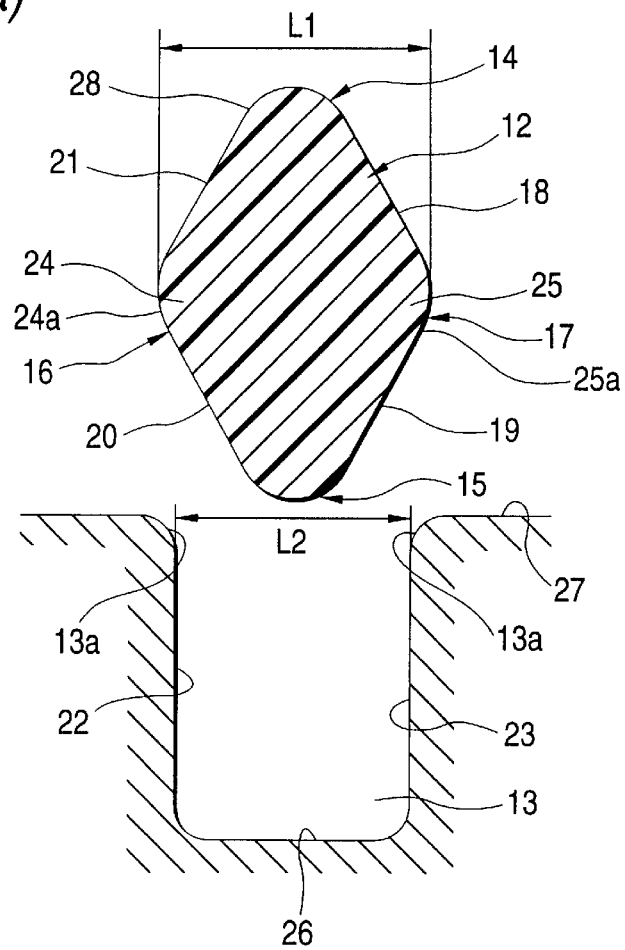
FIG. 1 shows a packing and a packing storage groove according to a first embodiment of the invention; in particular, FIG. 1 (*a*) is a section view thereof, showing a state before the packing is stored into the packing storage groove, and FIG. 1 (*b*) is a section view, showing a state in which the packing is stored in the packing storage groove.
Figure 1:
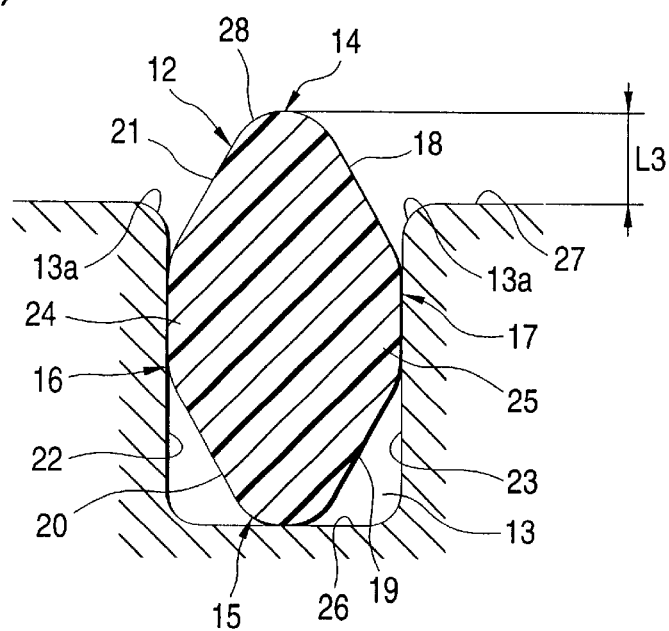

Now, FIG. 1 shows a packing 12 and a packing storage groove 13 in which the packing 12 can be stored: in more particular, FIG. 1 (*a*) shows a state before the packing 12 is inserted into the packing storage groove 13; and, FIG. 1 (*b*) shows a state in which the packing 12 is stored in the packing storage groove 13.

As shown in FIG. 1, the packing 12 has a diamond-shaped section and includes corner portions 14 and 15 which respectively extend in the vertical direction (that is, a direction in which the packing 12 is inserted into the packing storage groove 13), while the two corner portions 14 and 15 are both formed in an arc shape. Also, the other two corner portions 16 and 17 of the packing 12, which respectively extend in a direction intersecting the above-mentioned vertical direction, are also formed in an arc shape. And, the corner portions 14, 15 and corner portions 16, 17 respectively continue with each other smoothly through inclined surfaces 18, 19, 20 and 21.

The corner portion 14, in a state where the packing 12 is stored in the packing storage groove 13, projects out from the packing storage groove 13 and provides a seal surface which can be closely contacted with its mating mounting surface. The corner portions 16 and 17 respectively provide projecting portions 24 and 25 which, in a state where the packing 12 is stored in the packing storage groove 13, project toward the two mutually opposing inner surfaces 22 and 23 of the packing storage groove 13. A dimension Li between the respective top portions 24*a* and 25*a* of the two projecting portions 24 and 25 is set larger than the width dimension L2 of the packing storage groove 13.

The packing storage groove 13 is composed of two inner surfaces 22 and 23, with which the projecting portions 24 and 25 can be pressure contacted, and a bottom surface 26 with which the corner portion 15 can be contacted; and, the packing storage groove 13 has a rectangular section as a whole. Also, the periphery of the opening of the packing storage groove 13 provides a seal end face 27 which can be engaged with its mating mounting surface (not shown); that is, if the seal end face 27 is engaged with its mating mounting surface, then the packing 12 is pressed and held by and between the seal end face 27 and its mating mounting surface.

As shown in FIG. 1 (*a*), if the packing 12 is inserted into the opening of the packing storage groove 13 with the corner portion 15 down, then the inclined surfaces 19 and 20 are slided against the opening edges 13*a* of the packing storage groove 13, with the result that a dimension between the corners 16 and 17 of the packing 12 is gradually reduced, whereas the dimension of the packing 12 in the vertical direction (that is, a dimension between the corner portions 14 and 15 of the packing 12) is thereby caused to increase.

In a state where the packing 12 is stored within the packing storage groove 13 finally, as shown in FIG. 1 (*b*), while the projecting portions 24 and 25 are pressed against the inner surfaces 22 and 23 of the packing storage groove 13, the corner portion 14 projects out from the seal end face 27 by a given dimension L3. In this state, since the projecting portions 24 and 25 of the packing 12 are pressed against the inner surfaces 22 and 23 of the packing storage groove 13, the packing 12 is held by itself within the packing storage groove 13.

According to the present embodiment, because the securing projections and the like used to hold the packing 12 within the packing storage groove 13 do not project locally from the packing 12 but are composed of arc-shaped corner portions 14, 15, 16, 17 and inclined surfaces 18, 19, 20, 21 respectively connecting the corner portions with each other, the packing 12 can be simplified in shape. As a result of this, the packing can be manufactured at a reasonable cost.

Also, since the packing 12 is held by itself within the packing storage groove 13 through the projecting portions 24 and 25 thereof, not only the packing 12 is prevented from floating up or shifting with respect to the packing storage groove 13, but also the packing 12 is prevented from being removed from the packing storage groove 13 unexpectedly; that is, the packing 12 can always be held in its normal position. As a result of this, the lowering of the waterproof performance of the connector can be surely prevented.

Further, when storing the packing 12 into the packing storage groove 13, because the inclined surfaces 19 and 20 are slided against the opening edges 13a of the packing storage groove 13 to thereby gradually reduce the dimension between the corner portions 24 and 25 of the packing 12, the packing 12 can be assembled into the packing storage groove 13 easily, which in turn can enhance the efficiency of the assembling operation.

Now, description will be given below of a second embodiment of a packing hold connector according to the invention. In the second embodiment, the same components as in the previously described first embodiment are given the same designations and thus duplicate description thereof is omitted here.

SECOND EMBODIMENT

Figure 2:
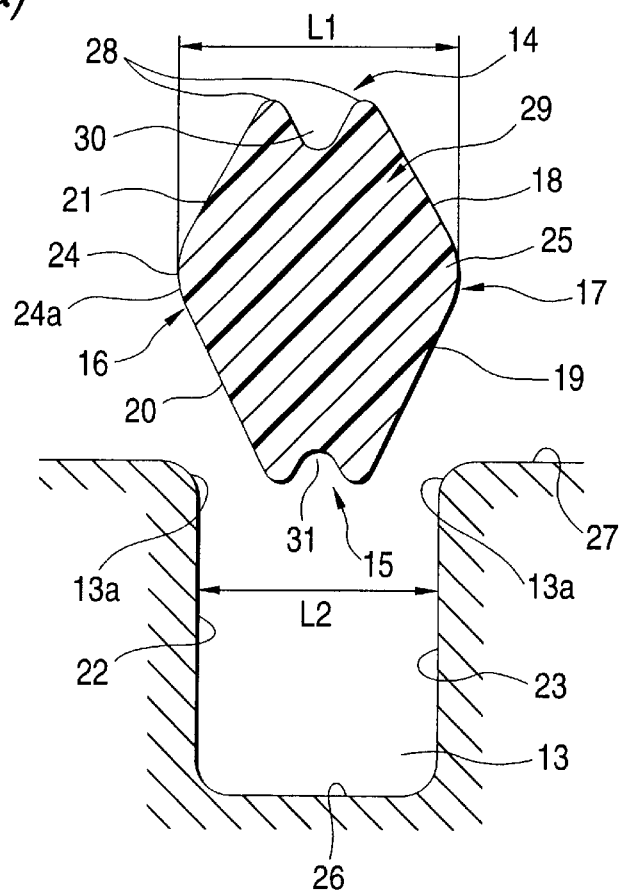
FIG. 2 shows a packing and a packing storage groove according to a second embodiment of the invention; in particular, FIG. 2 (*a*) is a section view thereof, showing a state before the packing is stored into the packing storage groove, and FIG. 2 (*b*) is a section view, showing a state in which the packing is stored in the packing storage groove.
Figure 2:
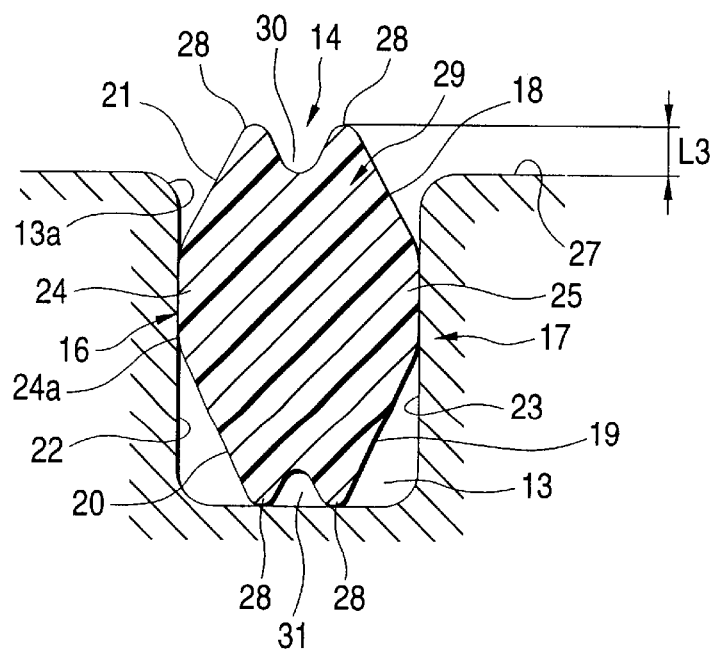

Next, description will be given below of a packing hold structure shown in FIG. 2 according to the second embodiment of the invention. As shown in FIGS. 2 (a) and (b), a packing 29 according to the present embodiment includes two arc-shaped absorbing recessed portions 30 and 31 which are respectively formed in the vertically extending corner portions 14 and 15, that is, on the seal surface 28 side thereof and on the packing storage groove 13 bottom surface 26 side thereof. These two absorbing recessed portions 30 are respectively able to absorb restitutive or reactive forces generated from the inner surfaces 22 and 23 of the packing storage groove 13 when the projecting portions 24 and 25 are pressed against the inner surfaces 22 and 23 of the packing storage groove 13, thereby being able to restrict the expansion of the packing 29 in a direction where the packing 29 is projecting from the seal end face 27.

As shown in FIG. 2 (b), if the packing 29 is inserted into the packing storage groove 13, then the projecting portions 24 and 25 of the packing 29 are pressed against the inner surfaces 22 and 23 of the packing storage groove 13 to thereby generate the reactive forces from the inner surfaces 22 and 23 and, due to the thus generated reactive forces, the packing 29 is going to expand in the vertical direction. However, such reactive forces are absorbed by the absorbing recessed portions 30 and 31 because the inside widths of the absorbing recessed portions 30 and 31 are reduced, so that the expansion of the packing 29 in the vertical direction can be restricted. As a result of this, the projecting height L3 of the packing 29 from the seal end face 27 in the periphery of the opening of the packing storage groove 13 can be prevented or restricted from increasing from the normal height dimension thereof.

According to the present embodiment, there can be obtained similar effects to the previously described first embodiment. Besides this, since the reactive forces generated and given to the projecting portions 24 and 25 of the packing 29 from the inner surfaces 22 and 23 of the packing storage groove 13 can be absorbed by the absorbing recessed portions 30 and 31 which are respectively formed in the vertically extending corner portions 14 and 15 of the packing 29, the projecting height L3 of the packing 29 from the seal end face 27 in the periphery of the opening of the packing storage groove 13 can be restricted; that is, the projecting height L3 can be kept as it is originally set. As a result of this, the waterproof performance of the connector can be enhanced further.

Also, provision of the absorbing recessed portions 30 and 31 allows the packing 29 to be closely contacted with its mating mounting surface on the seal surface 28, 28 sides thereof, that is, in the two portions thereof, which makes it possible to enhance the waterproof performance of the connector still further.

THIRD EMBODIMENT

Next, description will be given below of a third embodiment of a packing hold structure according to the invention with reference to FIG. 3. A packing 32 according to the present embodiment includes on both sides thereof four projecting portions 33, 34, 35 and 36 which respectively project toward the two inner surfaces 22 and 23 of the packing storage groove 13. Between the projecting portions 33 and 34 as well as between the projecting portions 35 and 36, there are formed recessed portions 37 and 38, respectively.

Figure 3:
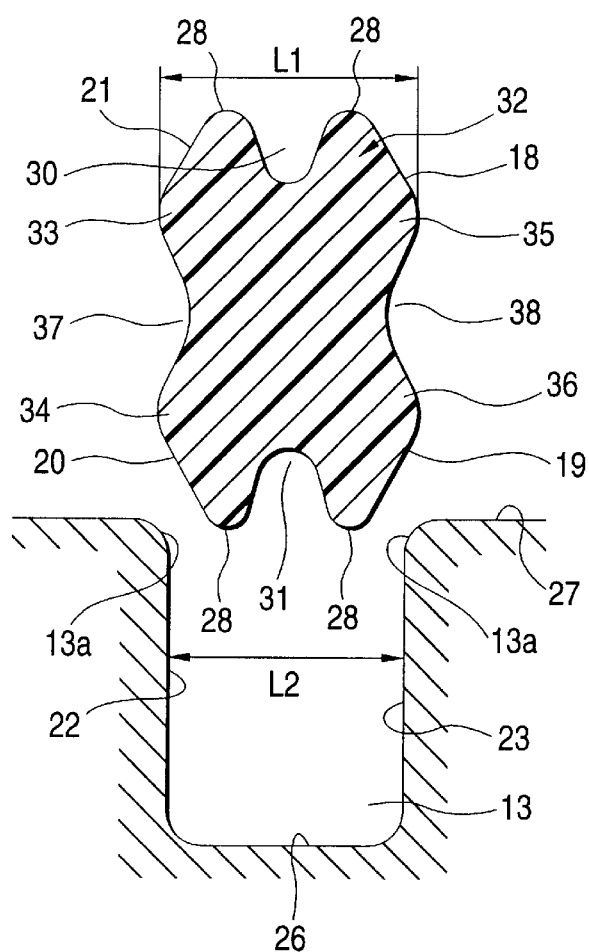
FIG. 3 shows a packing and a packing storage groove according to a third embodiment of the invention; in particular, FIG. 3 (*a*) is a section view thereof, showing a state before the packing is stored into the packing storage groove, and FIG. 3 (*b*) is a section view, showing a state in which the packing is stored in the packing storage groove.
Figure 3:
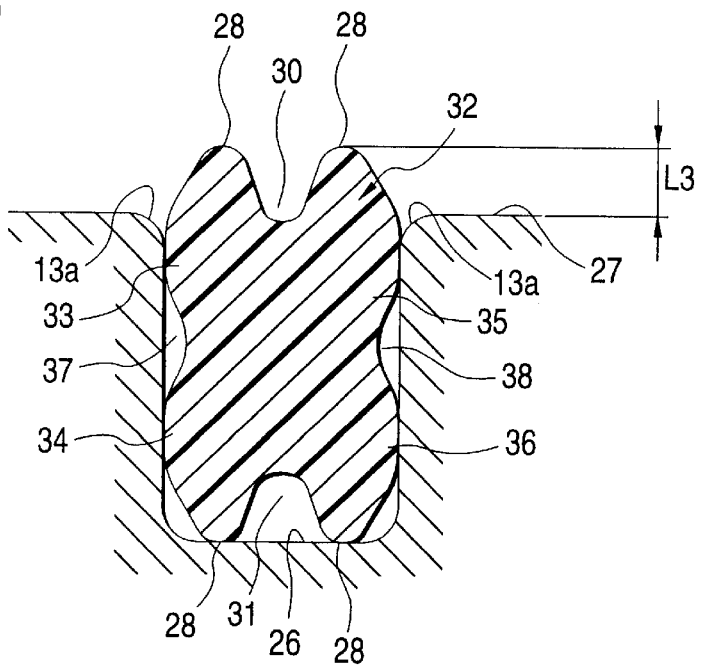
Figure 4:
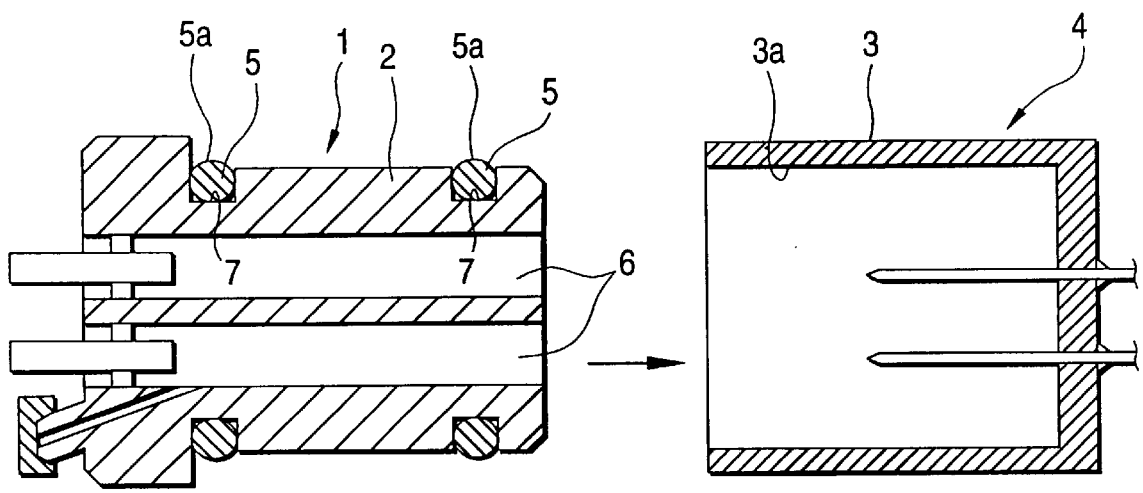
FIG. 4 is a section view of a waterproof connector to which a conventional packing hold structure is applied.
Figure 5:
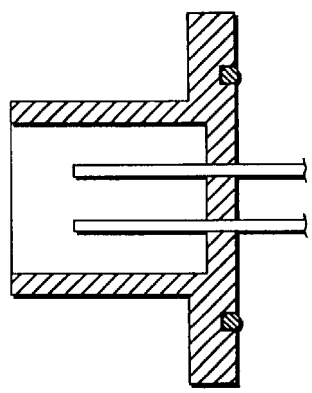
FIG. 5 shows a conventional butt packing; in particular, FIG. 5 (*a*) is a section view thereof, showing a state thereof before the butt packing is butted, and FIG. 5 (*b*) is a section view, showing a state in which the butt packing is butted against a panel or the like; and, FIG. 6 is a section view of a conventional packing hold structure.
Figure 5:
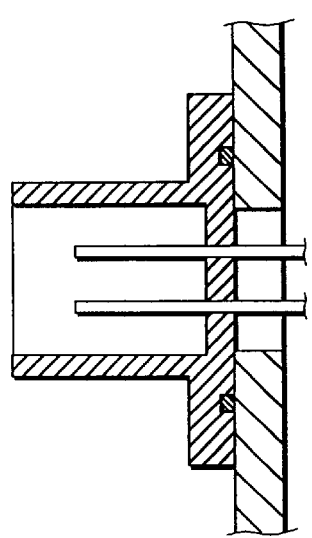
Figure 6:
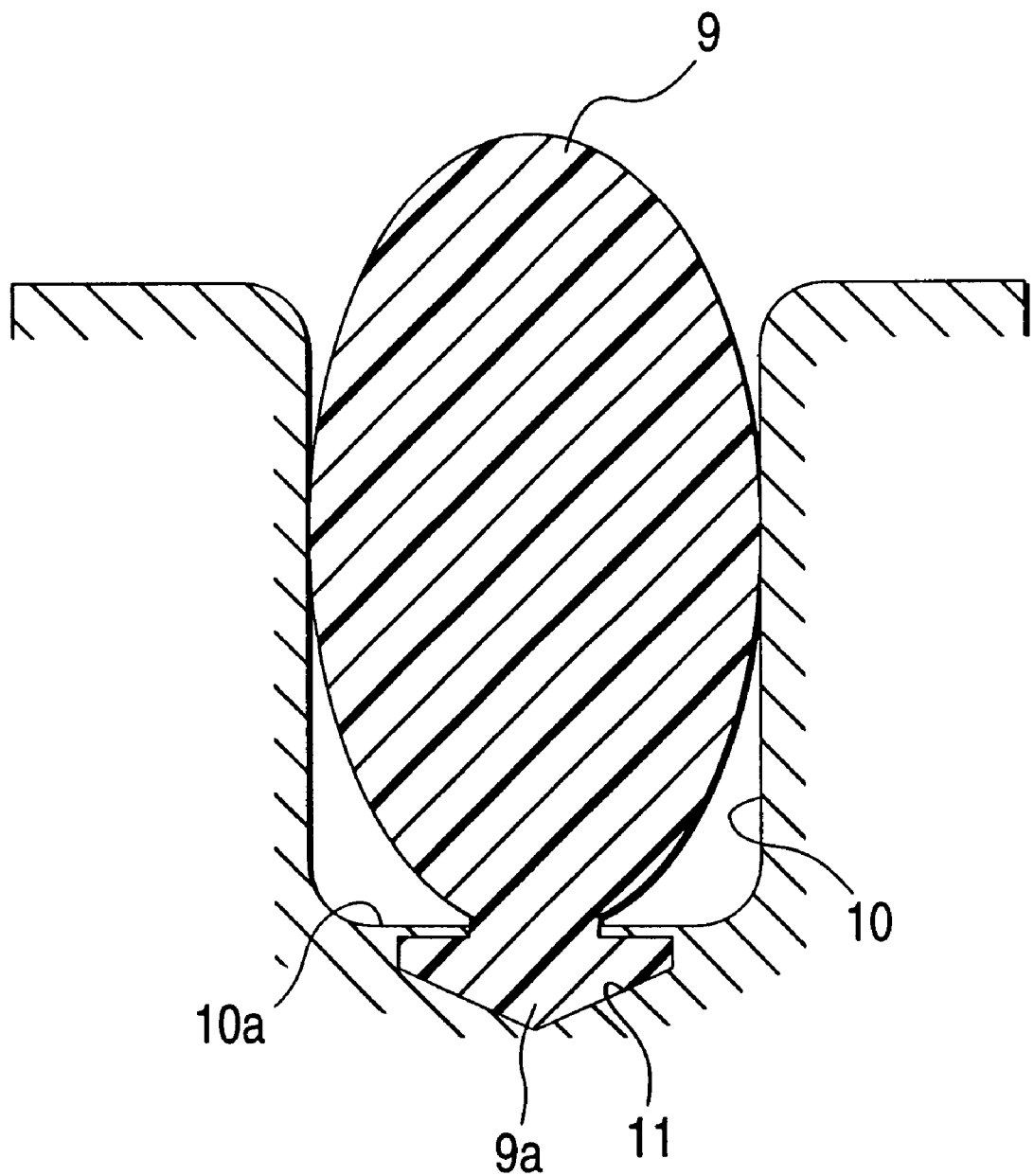

As shown in FIG. 3 (a), if the packing 32 with the recessed portion 31 while the recessed portion is opened downwardly is inserted into the upper portion of the packing storage groove 13, the projecting portions 33 and 34 are respectively pressed against and contacted with the inner surface 22 of the packing storage groove 13. At that time the projecting portions 35 and 36 are respectively pressed against and contacted with the inner surface 23 of the packing storage groove 13. In this inserting operation, although the packing 32 is going to expand in the vertical direction, since the reactive forces given to the projecting portions 33, 34, 35 and 36 from the inner surfaces 22 and 23 can be absorbed by the absorbing recessed portions 30 and 31, the expansion of the packing 32 in the vertical direction can be restricted. As a result of this, the projecting height L3 of the packing 32 from the seal end face 27 in the periphery of the opening of the packing storage groove 13 can be restricted from increasing up from the normal height dimension thereof.

According to the present embodiment, there can be obtained similar effects to the previously described first and second embodiment. Besides this, because the reactive forces given from the two inner surfaces 22 and 23 of the packing storage groove 13 can be dispersed not only due to provision of the two projecting portions 33 and 34 contactable with the inner surface 22 and two projecting portions 35 and 36 contactable with the inner surface 23 but also due to formation of the recessed portions 37 and 38 between the projecting portions 33 and 34 as well as between the projecting portions 35 and 36, the expansion of the packing 32 can be restricted still further, so that the projecting height L3 of the packing 32 from the seal end face 27 can be restricted to a proper height.

By the way, in the third embodiment, in the packing 32 which includes the absorbing recessed portions 30 and 31, there are provided the projecting portions 33, 34, 35 and 36. However, this is not limitative but it is also possible that, on the two sides of the packing 12 according to the first embodiment, there may be provided four projecting portions, that is, two projecting portions on each side.

As has been described heretofore, according to the invention, since the projecting portions are provided in the packing in such a simple manner that they project toward the mutually opposing inner surfaces of the packing storage groove, the shape of the packing can be simplified. Also, when inserting the packing into the packing storage groove, the packing may be inserted into the packing storage groove while the projecting portions of the packing are slided on the two inner surfaces of the packing storage groove, which can facilitate the assembling of the packing into the packing storage groove.

Further, because the packing is held by itself within the packing storage groove, not only the packing is prevented from being removed unexpectedly from the packing storage groove but also the packing can be closely contacted with its mating mounting surface at a normal position, so that a high waterproof performance can be provided.

According to the invention, if the projecting portions of the packing are contacted with the two inner surfaces of the packing storage groove, then the whole packing is going to expand in a direction where the packing is projecting from the seal end face; but, the reactive forces generated and given from the inner surfaces of the packing storage groove are absorbed by the absorbing recessed portions, so that the expansion of the packing can be restricted. This, in turn, makes it possible to restrict the projecting height of the packing from the seal surface, thereby being able to obtain a good mounting condition between the packing and its mating mounting end face, so that a good waterproof performance can be provided.

According to the invention, since the reactive forces given from the two inner surfaces of the packing storage groove can be dispersed due to provision of a plurality of projecting portions, the expansion of the packing can be restricted further and thus the projecting height of the packing from the seal surface can be restricted.

While there has been described in connection with the preferred embodiment of the invention, it will be obvious to those skilled in the art that various changes and modifications may be made therein without departing from the invention, and it is aimed, therefore, to cover in the appended claims all such changes and modifications that fall within the true spirit and scope of the invention.

What is claimed is:

1. A packing hold structure, comprising:
   an elastic packing within a packing storage groove formed in a seal end face, said elastic packing comprising:
   a pair of projecting portions extending in opposite directions and respectively having convexly curved side outer surfaces in an uncompressed state, said projecting portions respectively projecting toward two mutually opposing inner surfaces of said packing storage groove,
   wherein a dimension between said curved outer surfaces of said projecting portions is larger than a width dimension of said packing storage groove, and wherein when said packing is stored within said packing storage groove, said curved outer surfaces of said projecting portions are respectively pressed against inner surfaces of said packing storage groove allowing said packing to be held by itself within said packing storage groove.

2. A packing hold structure as set forth in the claim 1, further comprising:
   absorbing recessed portions for absorbing reactive forces generated when said projecting portions are pressed against said inner surfaces of said packing storage groove and for restricting expansion of said packing in a direction where said packing is projected from said seal end face,
   wherein said absorbing recessed portions are formed on a bottom facing side of said packing which faces the bottom surface side of said packing storage groove and a seal surface side of said packing which is opposite to said bottom facing side.

3. A packing hold structure as set forth in claim 2, wherein said packing comprises a plurality of said projecting portions which are projected toward one of said inner surfaces of said packing storage groove.

4. A packing hold structure as set forth in claim 1, wherein said packing comprises a plurality of said projecting portions which are projected toward one of said inner surfaces of said packing storage groove.

5. A packing hold structure as set forth in the claim 1, wherein said pair of projecting portions comprise first and second pairs of projecting portions,
   wherein a dimension between distal ends of each of said first and second pairs is larger than a width dimension of said packing storage groove, and
   wherein when said packing is stored within said packing storage groove, said first and second pairs of projecting portions are pressed against said inner surface of said packing storage groove allowing said packing to be held by itself within said packing storage groove.

6. A packing hold structure, comprising:
   an elastic packing within a packing storage groove formed in a seal end face, said elastic packing comprising:
   a main body; and
   first and second pairs of convexly curved projecting side portions respectively projecting from opposite sides of said main body toward inner surfaces of said packing storage groove,
   wherein a dimension between distal ends of said first and second pairs is larger than a width dimension of said packing storage groove, and
   wherein when said packing is stored within said packing storage groove, said pairs of projecting side portions are pressed against said inner surface of said packing storage groove allowing said packing to be held by itself within said packing storage groove.

* * * * *